United States Patent [19]
Huber et al.

[11] Patent Number: 6,005,698
[45] Date of Patent: Dec. 21, 1999

[54] NON-BLOCKING MULTI-CAST WDM COUPLING ARRANGEMENT

[75] Inventors: Manfred Huber, Gräfelfing; Robert Osborne, München, both of Germany

[73] Assignee: Siemens Aktiengesellschaft, Munich, Germany

[21] Appl. No.: 08/952,015

[22] PCT Filed: Jun. 5, 1996

[86] PCT No.: PCT/DE96/00990

§ 371 Date: Nov. 13, 1997

§ 102(e) Date: Nov. 13, 1997

[87] PCT Pub. No.: WO96/42180

PCT Pub. Date: Dec. 27, 1996

[30] Foreign Application Priority Data

Jun. 8, 1995 [DE] Germany .................. 195 20 976

[51] Int. Cl.[6] .................................................. H04J 14/00
[52] U.S. Cl. .......................................... 359/117; 385/17
[58] Field of Search ........................ 359/117, 128; 385/16–17; 370/380

[56] References Cited

U.S. PATENT DOCUMENTS 5,303,077  4/1994  Bottle et al. ..................... 359/117
5,369,514  11/1994  Eilenberger et al. ............. 359/117

*Primary Examiner*—Kinfe-Michael Negash
*Attorney, Agent, or Firm*—Hill & Simpson

[57] ABSTRACT

In a coupling arrangement for freely selectively switching through optical WDM (Wavelength Division Multiplex) signals, the input stage is formed with 1-x-m switching matrices, an optical signal with exactly one wavelength being fed to each 1-x-m switching matrix. In addition, the 1-x-m switching matrices and/or the space division multiplex switches of a central stage connected to the input stage are formed with semiconductor amplifiers (Semiconductor Optical Amplifiers). The coupling arrangement has the capability of switching through individual input signals in a non-blocking fashion to a plurality of output signals (multicast capability).

6 Claims, 4 Drawing Sheets

NON-BLOCKING MULTI-CAST WDM COUPLING ARRANGEMENT

BACKGROUND OF THE INVENTION

So called optical cross-connects make it possible to switch through optical WDM (Wavelength Division Multiplex) signals in a freely selectable, semipermanent fashion.

The subject matter of the application relates to a switching matrix for freely selectively switching through optical signals which are received on waveguides, which in each case have a given wavelength, onto output waveguides in which the optical signals which are received on input waveguides can be switched through in the direction of a desired output waveguide by means of a multistage space division multiplex switching element, the space division multiplex switching element has an input stage and an output stage, and a plurality of optical signals which are output by the output stage and are switched through in the direction of the output waveguide can be converted in a signal-specific waveguide converter into optical signals with fixed wavelengths which are different from one another.

An arrangement which has the abovementioned features is known from the International Conference on Communications (ICC) 1993, Geneva, 'Optical Path Layer Technologies to enhance B-ISDN Integrity'. In this arrangement, which is formed exclusively with space division multiplex switches, due to the design only one selecting through-connection, but not a multiple of a single optical signal, is possible in the input stage.

SUMMARY OF THE INVENTION

It is the object of the invention to develop a switching arrangement outlined at the beginning in such a way that, in addition to the switching-through capability of an incoming optical signal with the given wavelength onto any desired output waveguide as an optical signal with any desired wavelength, any desired optical signal can be provided of any desired wavelength which is capable of being switched through onto a plurality of output waveguides as a plurality of optical signals with the same, or different, wavelengths, or onto an output waveguide as a plurality of optical signals with different wavelengths.

According to the invention the input stage is formed with 1-x-m switching elements whose outputs can be switched independently of one another, and an incoming optical signal with precisely one wavelength is fed to the terminal, designated by "1", of an 1-x-m switching matrix.

The subject matter of the application, the 1-x-m switching have, in principle, reduced cross-talk and of which reduced attenuation by virtue of avoiding combiners necessary case of space division multiplex switches, provides a possibility of multi-casting an optical signal, fed in on a waveguide, over a plurality of output waveguides, freedom from blocking being provided for as long as there is a sufficient number of channels provided by wavelengths on the output waveguides.

In accordance with one particular development of the subject matter of the application, a 1-x-m switching matrix and/or a space division multiplex switch of the central stage is/are formed with a plurality of semiconductor amplifier switches which can be driven independently of one another. This measure provides, for example in multi-cast mode, the possibility of activating a plurality of outputs of a 1-x-m switching matrix and/or of a space division multiplex switch with a power level at the individual output switches that is independent of the distribution ratio, by mean which the power differences between the optical signals at the outputs of the space division multiplex switching arrangement are reduced.

The subject matter of the application will now be described in more detail as an exemplary embodiment with reference to the drawing figures wherein, like acting components are provided with identical designations.

DESCRIPTION OF THE PREFERRED EMBODIMENTS

Figure 3:
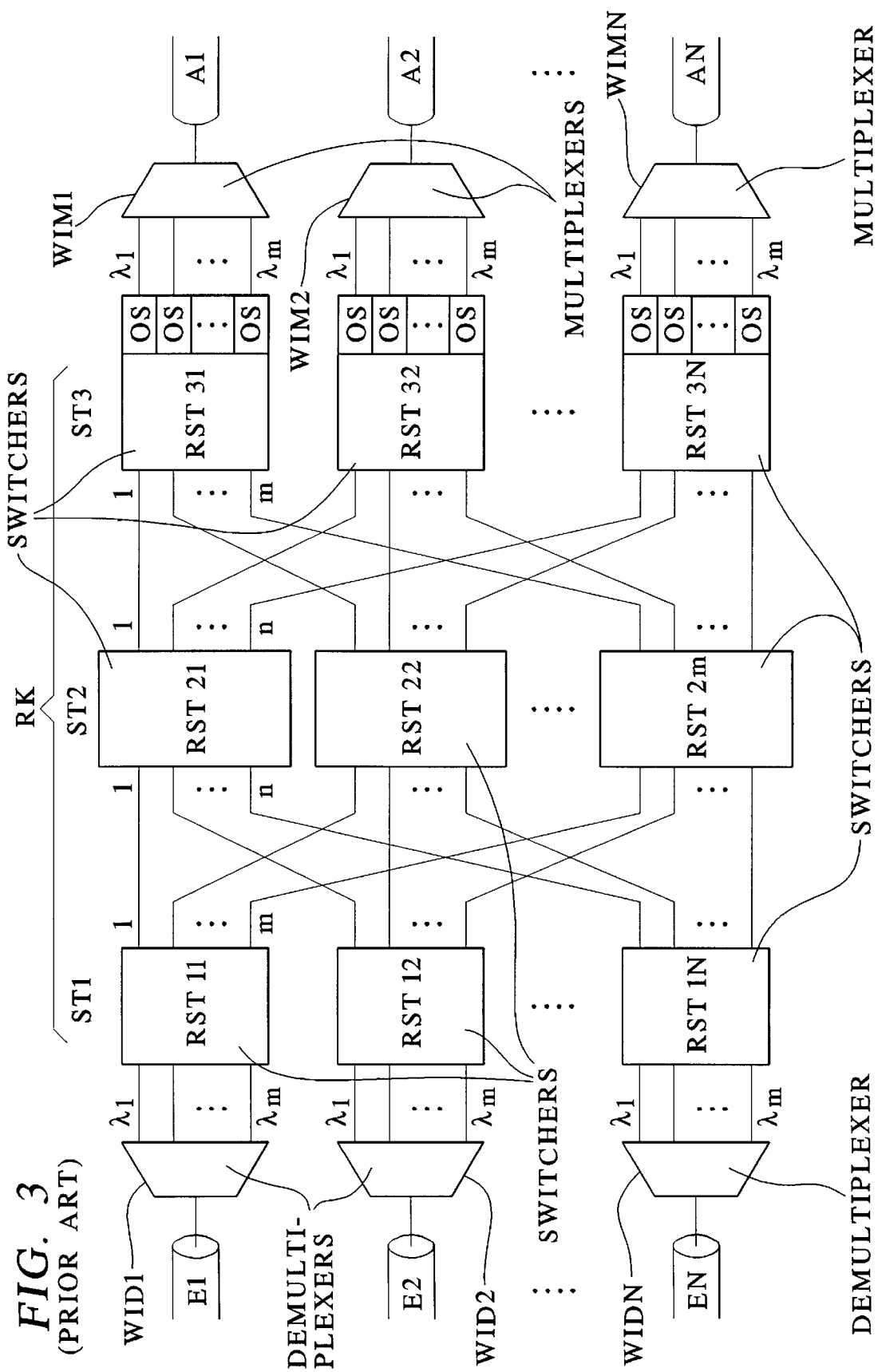
FIG. 3 shows a view of a switching arrangement which is known from the prior art.

FIG. 3 shows a switching arrangement, known from the reference mentioned at the beginning, for freely selectable switching through of optical signals, which are received on input waveguides E1 . . . EN, onto output waveguides A1 . . . AN. The input waveguides conduct in each case a plurality of optical signals, with wavelengths which are different from one another to an associated wavelength demultiplexer WID 1 . . . WID N. The wavelength demultiplexer conducts the optical signals for each wavelength $\lambda_1 \ldots \lambda_m$ separately to a waveguide. The wave-guides which conduct one optical signal with precisely one wavelength are connected to the inputs of a space division multiplex switcher RST 11 . . . RST 1N. The space division multiplex switchers RST 11 . . . RST 1N are arranged in the input stage ST1 of a space division multiplex arrangement RK formed with the input stage, a central stage ST2, and an output stage ST3. The space division multiplex switchers RST 11 . . . RST 1N permit an optical signal which is fed in at an input to be switched through to one of a plurality of outputs 1..m. The space division multiplex switches have, internally at their outputs, output-specific combiners. The outputs of a space division multiplex switch RST 11 . . . RST 1N are in each case connected to an input 1..n of different space division multiplex switches RST 21 . . . RST 2m of the central stage. The space division multiplex switches RST 21 . . . RST 2m permit an optical signal fed in at an input to be switched through to one of a plurality of outputs 1..n. The outputs of a space division multiplex switch RST 21 . . . RST 2m are each connected to an input 1..m of various space division multiplex switches RST 31 . . . RST 3N of the output stage. The space division multiplex switches RST 31 . . . RST 3N permit an optical signal fed in at an input to be switched through to one of a plurality of outputs 1..m. A wavelength converter OS is connected to each of the outputs of a space division multiplex switch RST 31 . . . RST 3N. The wavelength converters which are connected to a space division multiplex switch RST 31 . . . RST 3N convert the optical signals output by the space division multiplex switch into optical signals with wavelengths $\lambda_1 \ldots \lambda_m$ which are different from one another. The optical signals which are output by a space division multiplex switch RST 31 . . . RST 3N with wavelengths which are different from one another are fed via a wavelength multiplexer WIM to an output waveguide which is assigned to the space division multiplex switch.

Figure 1:
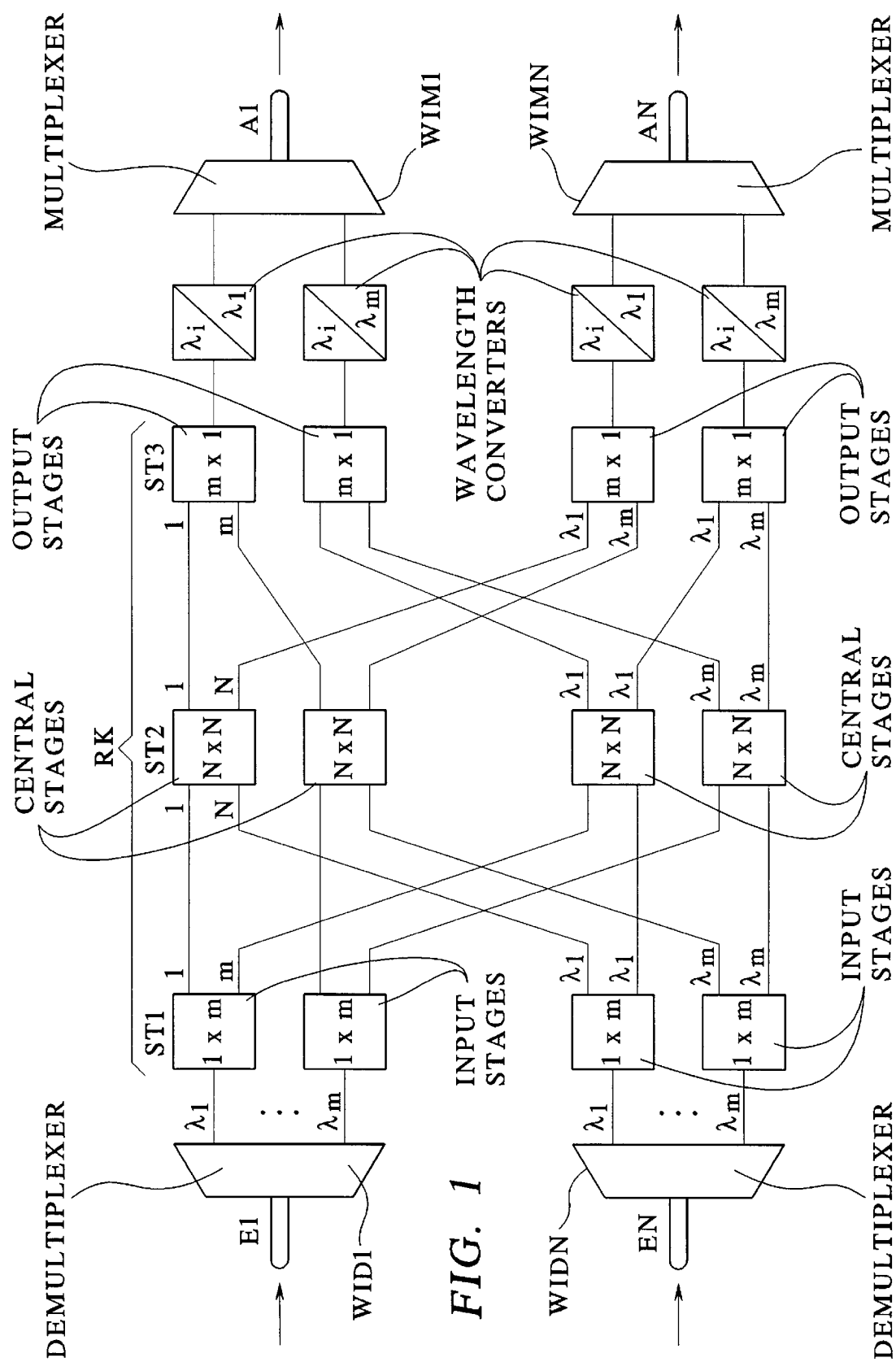
FIG. 1 shows an illustration of the principle of a first embodiment of the switching arrangement according to the invention.
Figure 2:
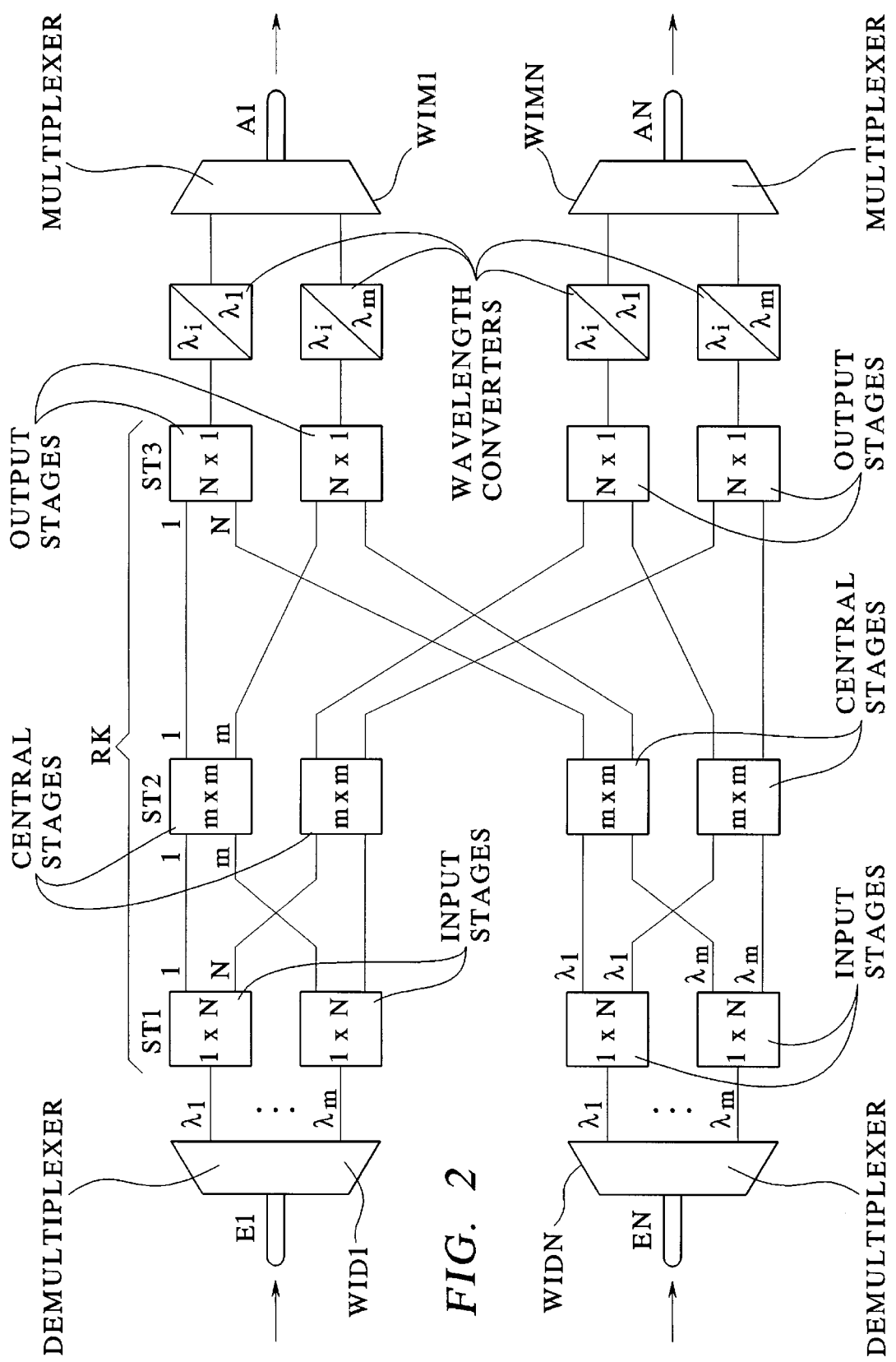
FIG. 2 shows an illustration of the principle of a second embodiment of the switching arrangement according to the application.
Figure 4:
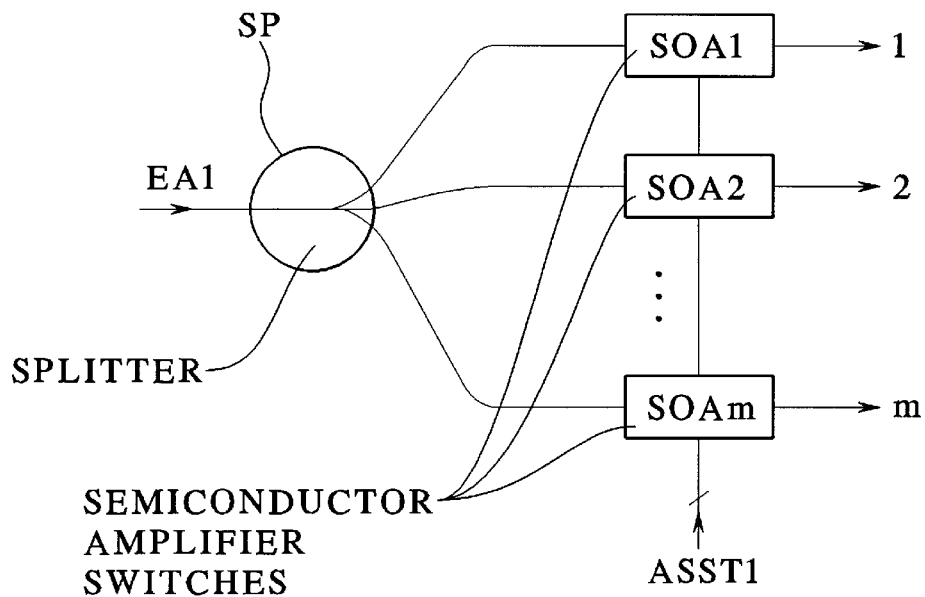
FIG. 4 shows an illustration of the principle of a 1-x-m switching element which is formed with optical semiconductor amplifiers.

In the switching arrangements according to the application in accordance with FIG. 1 and FIG. 2, in contrast with the known switching arrangement according to FIG. 3, 1-x-m switching matrices are arranged in the input stage and in the output stage instead of space division multiplex switching elements with a plurality of inputs and a plurality of outputs. With the present invention, 1-x-m switching matrices are arranged only in the input stage of the space division multiplex switching arrangement. In a further aspect of the invention, 1-x-m switching matrices are arranged in the input stage of the space division multiplex switching arrangement and m-x-1 switching matrices are arranged in the output stage. In the input stage, each waveguide, which conducts an optical signal with precisely one wavelength, is connected to the terminal, designated by "1", of a 1-x-m switching matrix. The 1-x-m switching matrix according to FIG. 4 is formed with a splitter SP which feeds on the output side to a plurality of semiconductor amplifier switches SOA1 . . . SOAm (Semiconductor Optical Amplifier) known per se, an optical signal of which has been fed in on the input side. The optical signals output by the semiconductor amplifier switches at their outputs can be switched on and off by means of drive signals ASST1 fed in from the outside. A 1-x-m switching matrix is therefore capable of switching through the optical signal fed in to the terminal designated by "1" to only one output, to a plurality of outputs, or to all the outputs, in accordance with the drive signals fed in from the outside.

Figure 5:
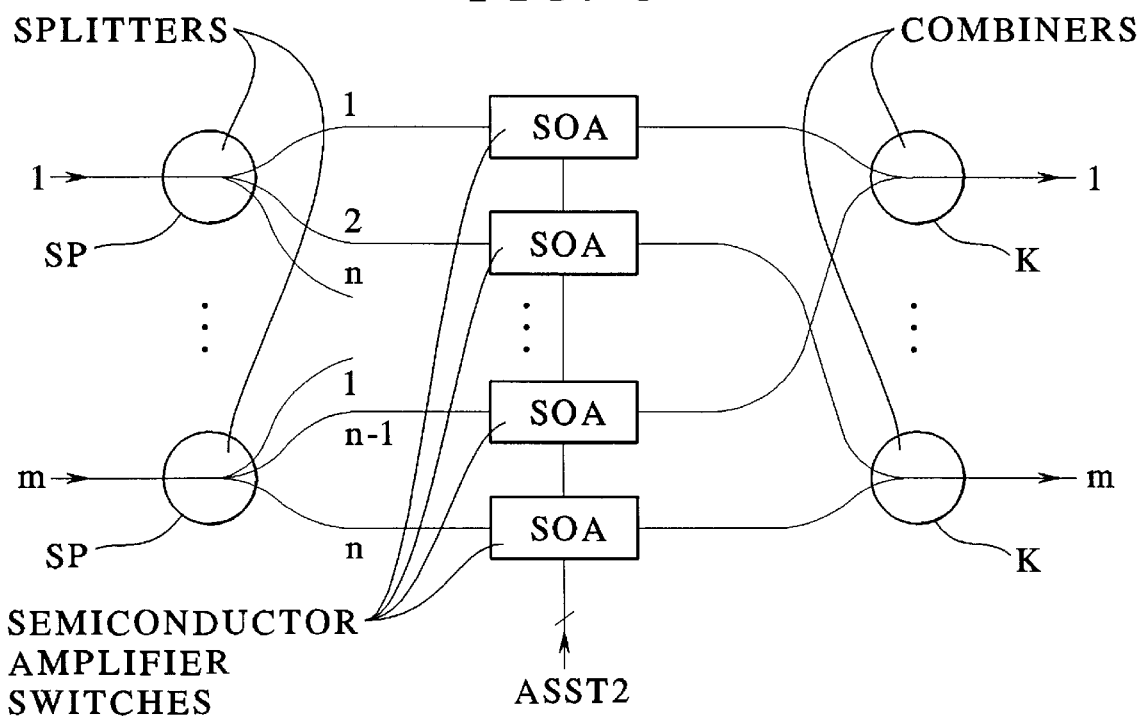
FIG. 5 shows an illustration of the principle of a 1-x-m switching element formed with optical semiconductor amplifiers.

In the space division multiplex switching arrangements according to the invention in accordance with FIG. 1 and FIG. 2, the space division multiplex switches of the central stage are formed in accordance with FIG. 5 in each case with splitter SP, semiconductor amplifier switches SOA (Semiconductor Optical Amplifier) and combiners K. Here, a splitter is connected on the input side to an input of a space division multiplex switch and on the output side to a plurality n of semiconductor amplifier switch. The combiners are connected on the output side to an output of the space division multiplex switch. The outputs of the semiconductor amplifier switches are connected to the inputs of the combiners in such a way that a through-switching path is provided from each input of the space division multiplex switch to each output of the space division multiplex switch. The number of semiconductor amplifier switches is determined by the number m squared of inputs and outputs of the space division multiplex switch. The individual semiconductor amplifier switches of a space division multiplex switch can be switched on and off by means of drive signals ASST2 fed in from the outside. A space division multiplex switch is therefore capable of switching through the optical signal fed in at an input to only one output, to a plurality of outputs or to all the outputs of a plurality of outputs, in accordance with the drive signals fed in from the outside.

Although various minor changes and modifications might be proposed by those skilled in the art, it will be understood that our wish is to include within the claims of the patent warrented hereon all such changes and modifications as reasonably come within our contribution to the art.

In the space division multiplex switching arrangements according to the invention in accordance with FIG. 1 and FIG. 2, the output stage may be formed with m-x-1 switching matrices or with n-x-1 switching matrices. In this context the m or n inputs are fed to the output via a combiner.

In the first embodiment according to FIG. 1, the 1-x-m switching matrices of the input stage have exactly the same number of outputs as the number of wavelengths in an input waveguide E1 . . . EN. The central stage is formed with a number of space division multiplex switches N×N which is equal to the number of wavelengths squared, and the number of inputs and outputs of the space division multiplex switches N×N is equal in each case to the number of input waveguides or the number of output waveguides. Each space division multiplex switch of the central stage conducts optical signals of a single wavelength. The outputs of the space division multiplex switches of the central stage are connected to the inputs of m-x-1 switching matrices of the output stage.

An optical signal with a wavelength which is different from the wavelengths of the other optical signals can be fed to each input of an m-x-1 switching matrix. The m-x-1 switching matrices, the number of which is equal to the product of the number of input waveguides and the number of output waveguides and the number of different wavelengths used, are connected to a respective wavelength converter $\lambda_i/\lambda_1 \ldots \lambda_i/\lambda_m$ via their terminal designated by "1". In this embodiment, an assignment of the input wavelength to a specific output wavelength takes place in the input stage. An assignment of the input wavelength to the desired output waveguide takes place in the central stage. Furthermore, in this first embodiment the connections between the first stage and the central stage and also between the central and the output stage take place in a structure which has become known in the specialist literature as a Müller tree structure.

In the second embodiment according to FIG. 2, the 1-x-N switching matrices of the input stage have exactly the same number of outputs as the number of input waveguides E1 . . . EN. The central stage is formed with a number of space division multiplex switches mxm which is equal to the number of input waveguides squared and the number of inputs and outputs of which is equal in each case to the number of possible wavelengths. Each space division multiplex switch of the central stage can switch through optical signals which each have one of the possible wavelengths. The outputs of the space division multiplex switches of the central stage are connected to the inputs of N-x-1 switching matrices of the output stage. The N-x-1 switching matrices, whose number is equal to the product of the number of the input waveguides or number of output waveguides and the number of the different wavelengths used, are connected to a respective wavelength converter by their terminal designated by "1". In this embodiment, an assignment of the input wavelength to the desired output waveguide takes place in the input stage. An assignment of the input wavelength to a specific output wavelength takes place in the central stage.

We claim as our invention:

1. A switching matrix for freely selectively switching through a plurality of optical signals of a given wavelength received on waveguides onto output waveguides, comprising:

a multi-stage space division multiplex switching arrangement for switching through the plurality of optical signals in a direction of a desired output waveguide;

the space division multiplex switching arrangement having an input stage and an output stage, the output stage outputting the plurality of optical signals which are switched through in the direction of the desired output waveguide;

a signal-specific wavelength converter for converting said plurality of optical signals into optical signals with fixed wavelengths which are different from one another;

said input stage being formed with 1-x-m switching matrices whose outputs can be switched independently of one another; and an incoming optical signal with exactly one wavelength being fed to a terminal designated by "1" of a 1-x-m switching matrix of the input stage.

2. The switching matrix according to claim 1 wherein the central stage has a space division multiplex switch connected at an input side of the input stage and at an output side to the output stage.

3. The switching matrix according to claim 1 wherein the 1-x-m switching matrices are formed with a plurality of driveable semiconductor amplifier switches.

4. The switching matrix according to claim 1 wherein the space division multiplex switching arrangement is formed with a plurality of driveable semiconductor amplifier switches.

5. The switching matrix according to claim 1 wherein:

a plurality of optical signals with wavelengths which are different from one another are present at an input waveguide; and an optical signal with exactly one wavelength fed to a plurality of the 1-x-m switching matrices via a wavelength demultiplexer connected to said input waveguide.

6. The switching matrix according to claim 1 wherein:

the output stage is formed with m-x-1 switching matrices;

the terminal designated by "1" of an m-x-1 switching matrix being connected to an associated wavelength converter; and said optical signals which are output by said output stage having wavelengths which are different from one another and which are fed to the output waveguide via a wavelength multiplexer.

* * * * *